April 5, 1960         G. A. WISWELL         2,931,279
TRAFFIC CENTER LINE METHOD AND APPARATUS
Filed March 11, 1954         7 Sheets-Sheet 1
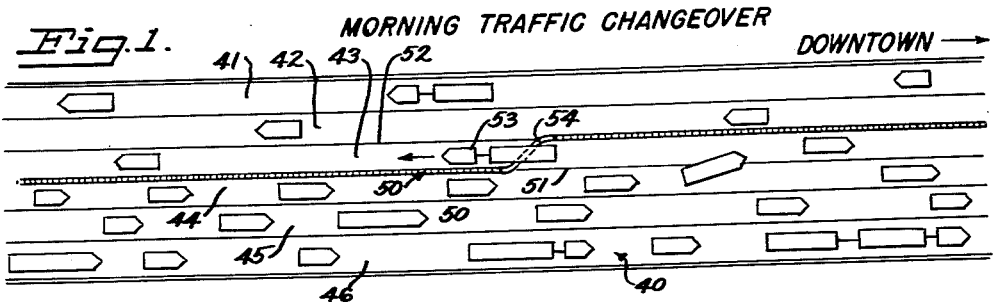
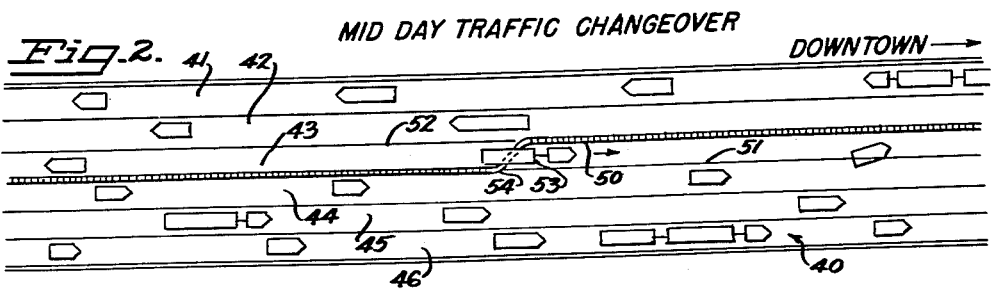
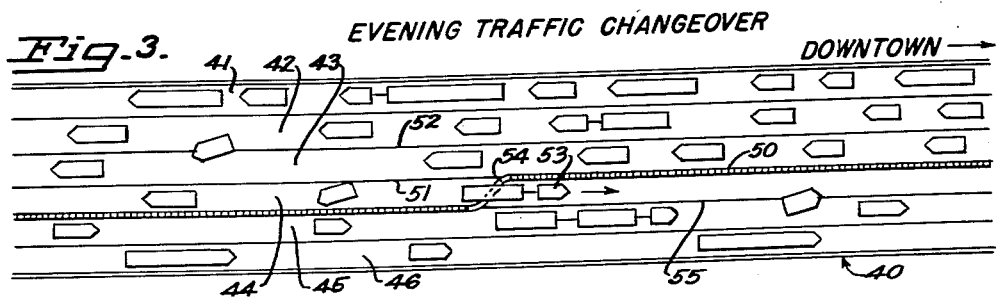
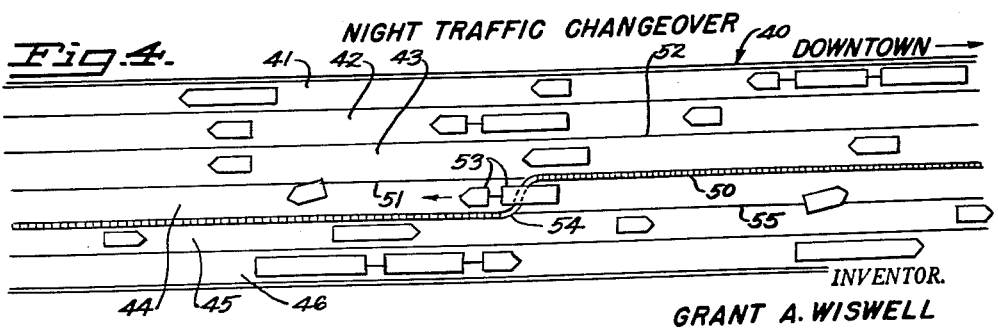
INVENTOR.
GRANT A. WISWELL
BY
ATTORNEY

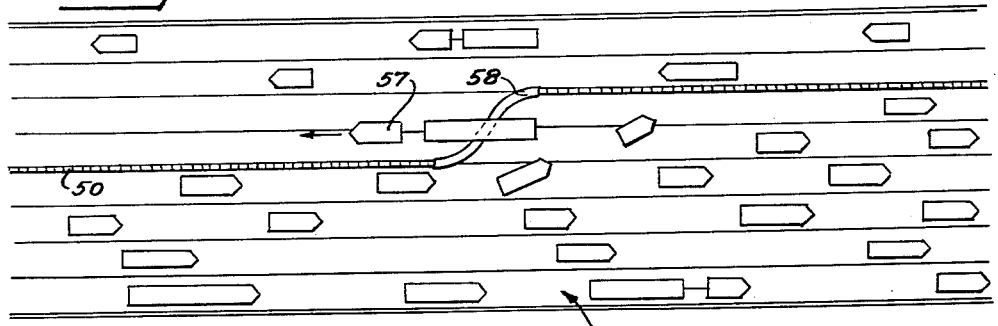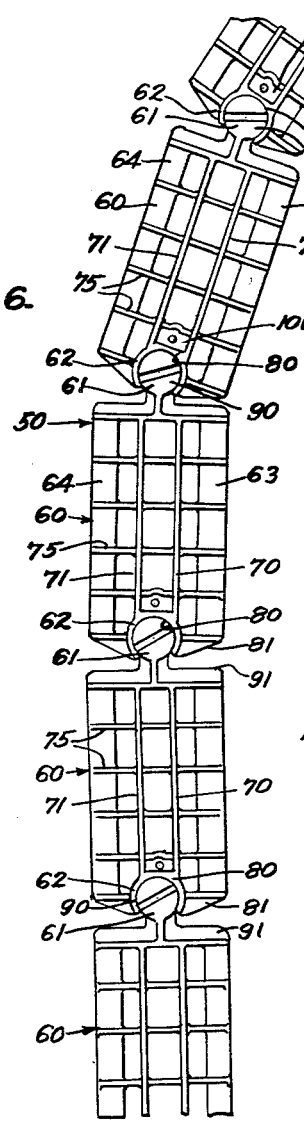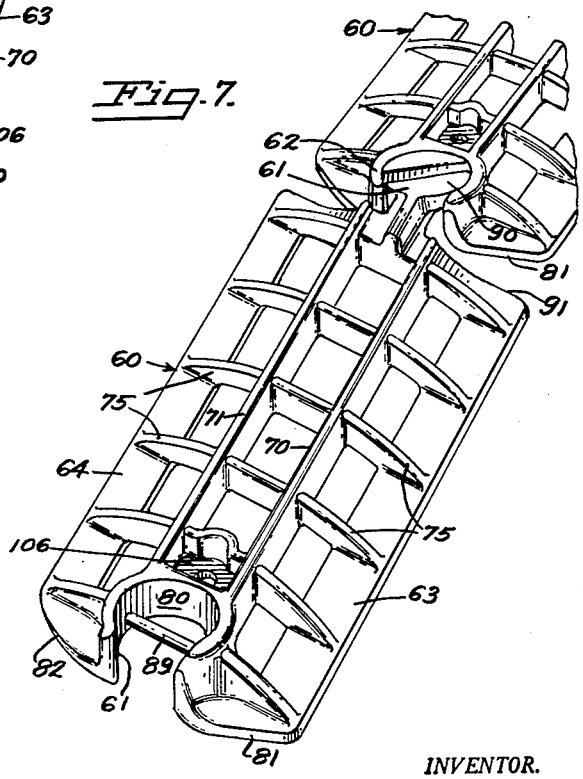

April 5, 1960 G. A. WISWELL 2,931,279
TRAFFIC CENTER LINE METHOD AND APPARATUS
Filed March 11, 1954 7 Sheets-Sheet 3
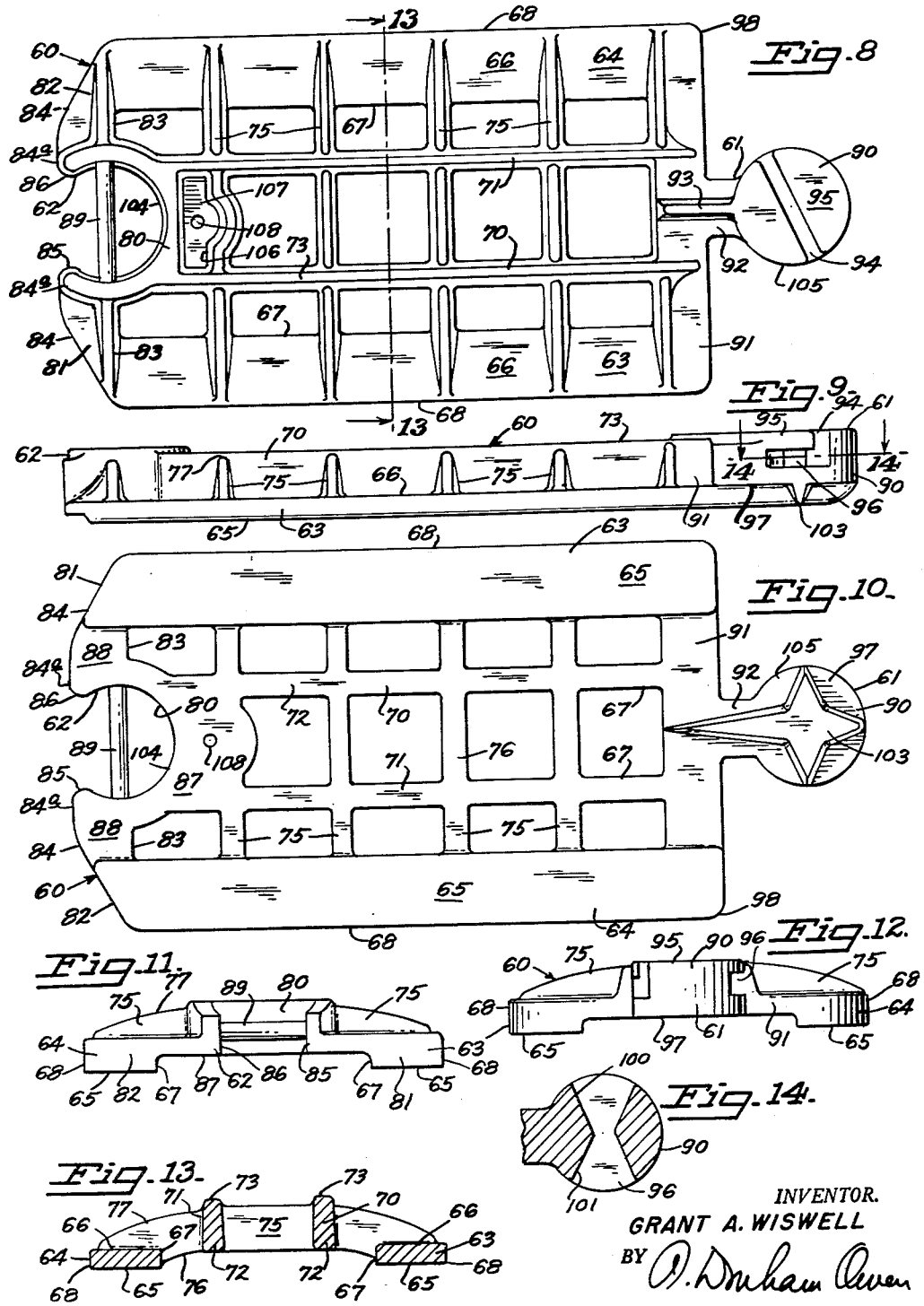
INVENTOR.
GRANT A. WISWELL
BY
ATTORNEY April 5, 1960 G. A. WISWELL 2,931,279
TRAFFIC CENTER LINE METHOD AND APPARATUS
Filed March 11, 1954 7 Sheets-Sheet 4
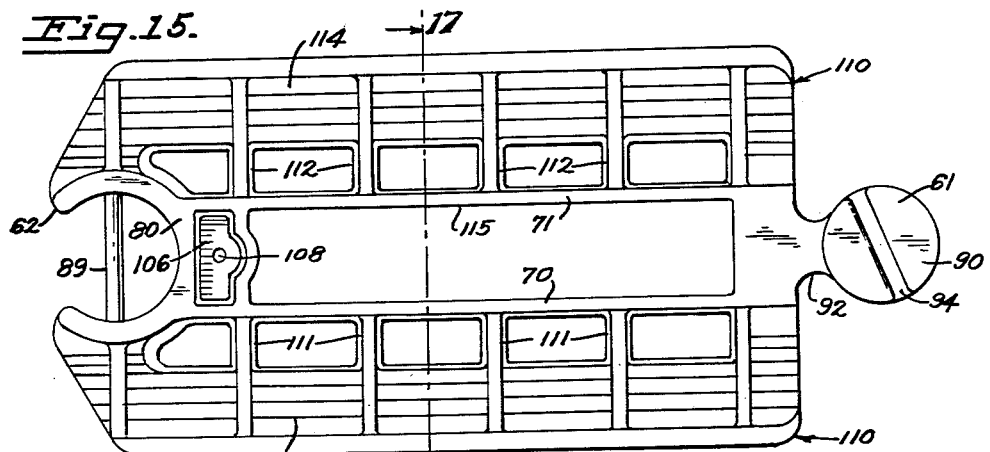
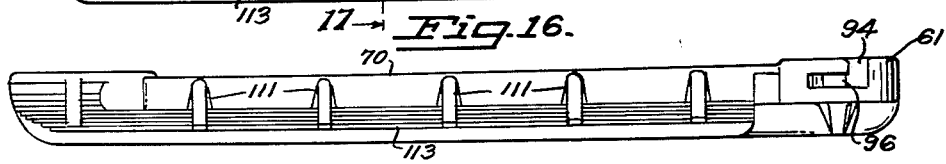
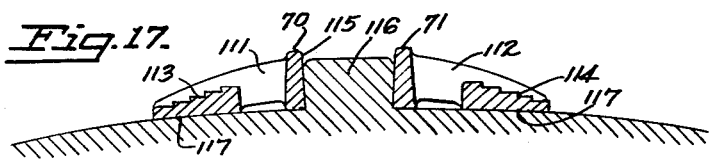
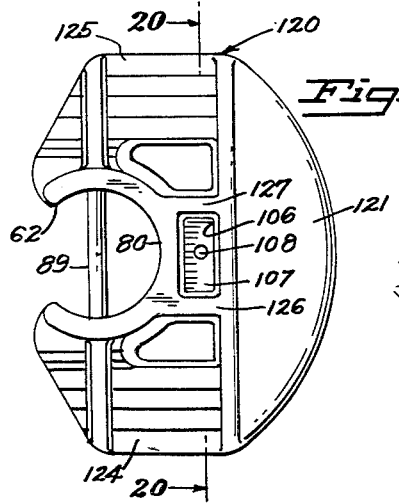
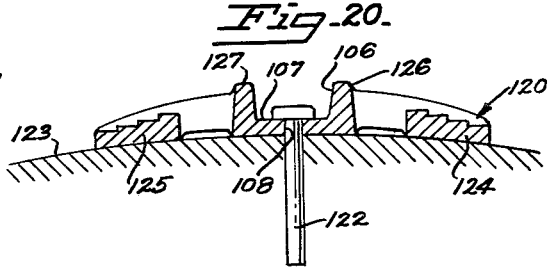
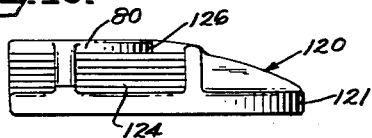
INVENTOR.
GRANT A. WISWELL
BY
ATTORNEY

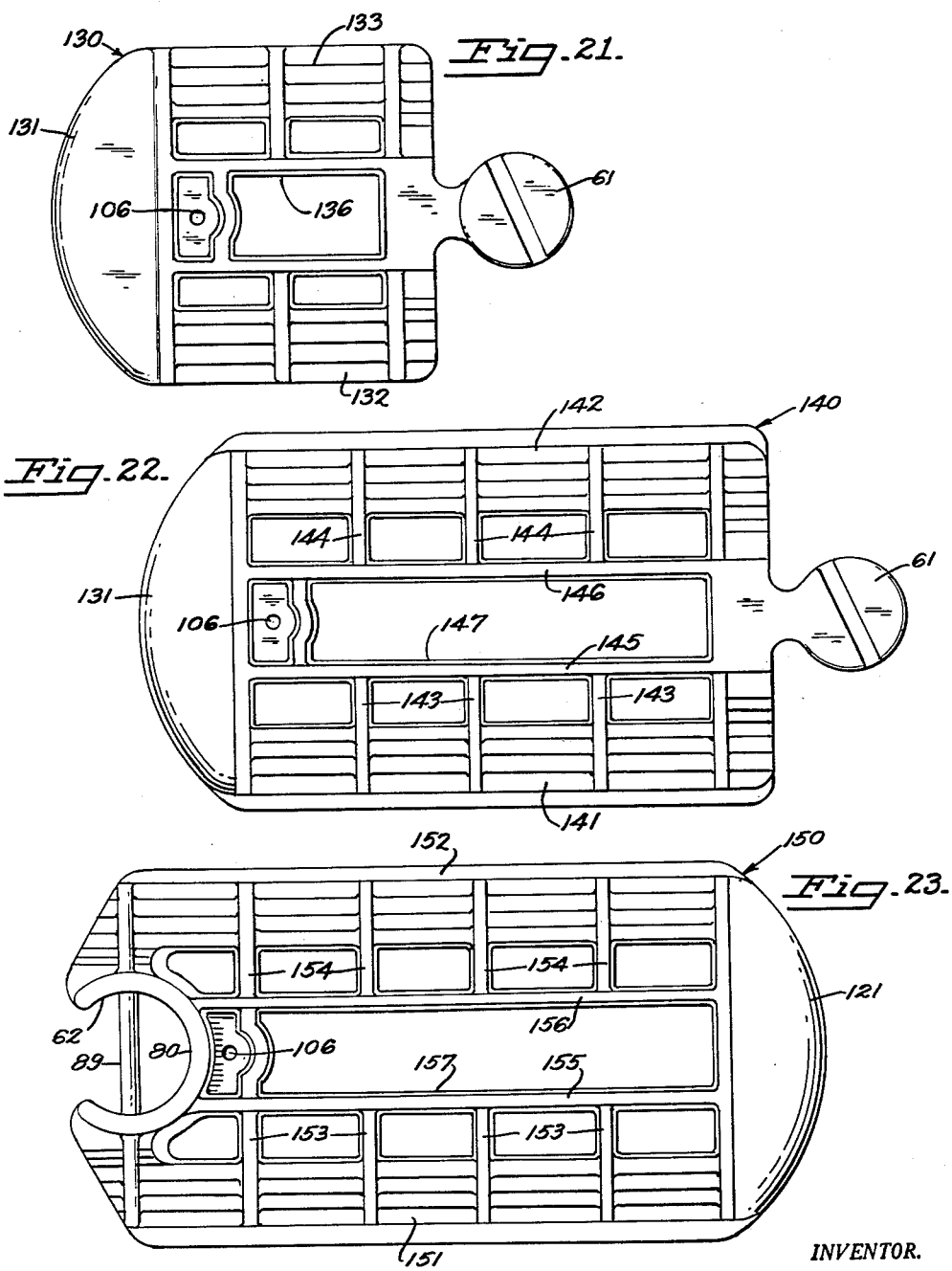

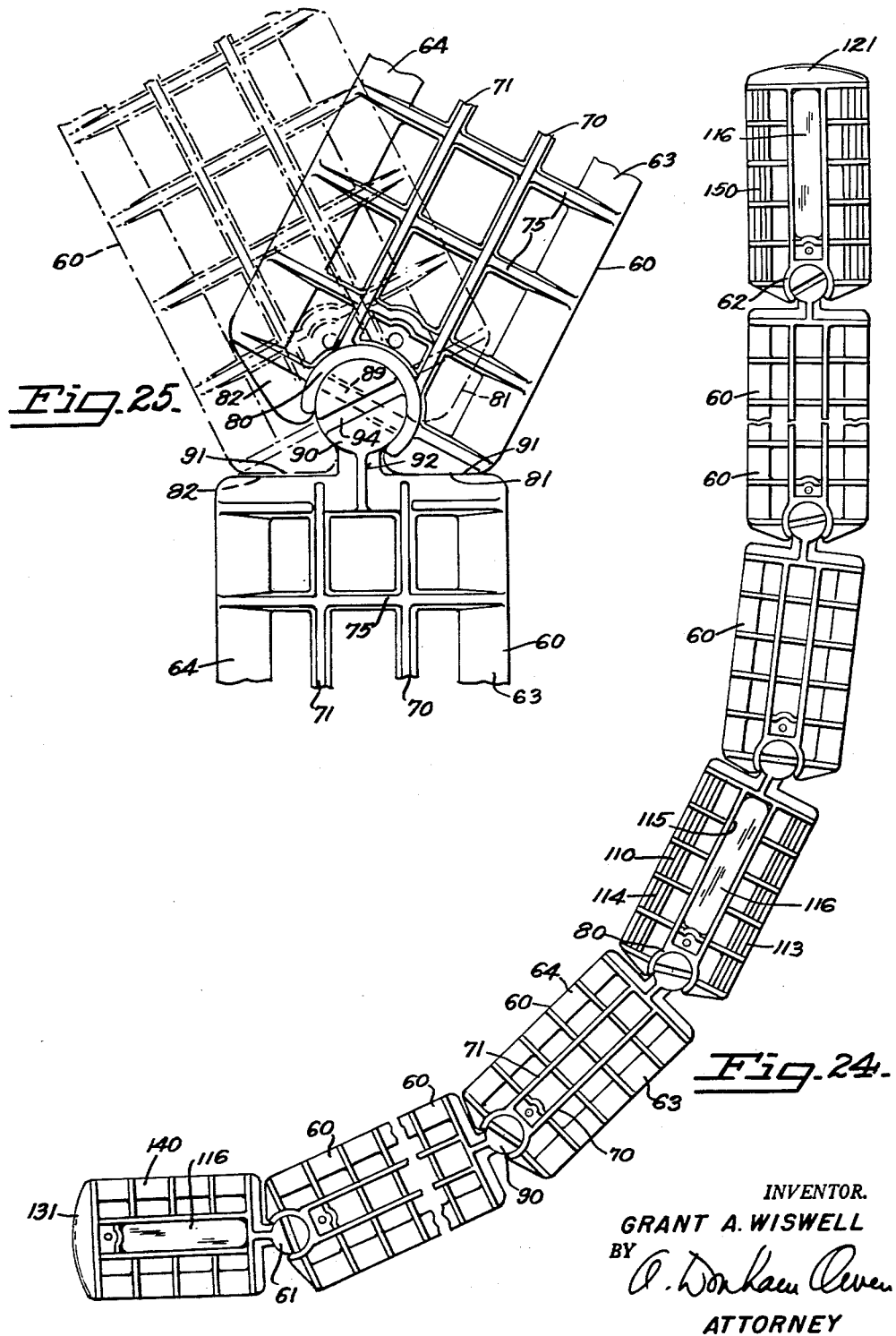

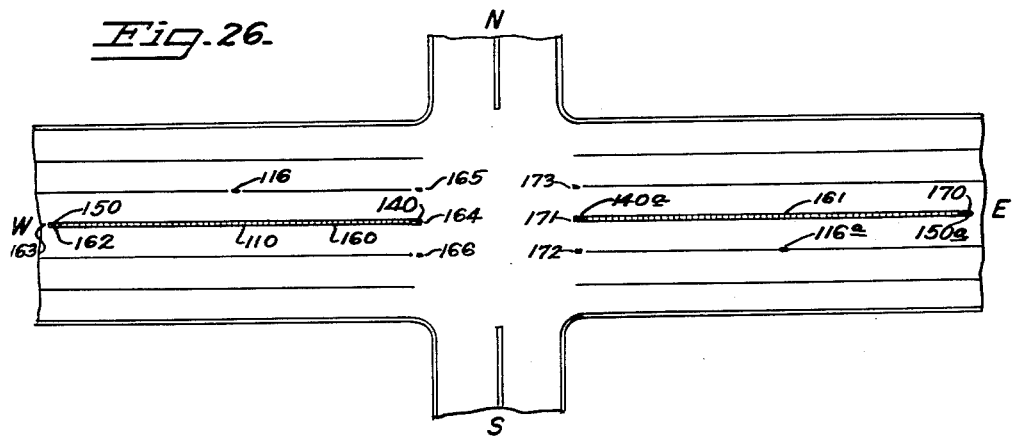
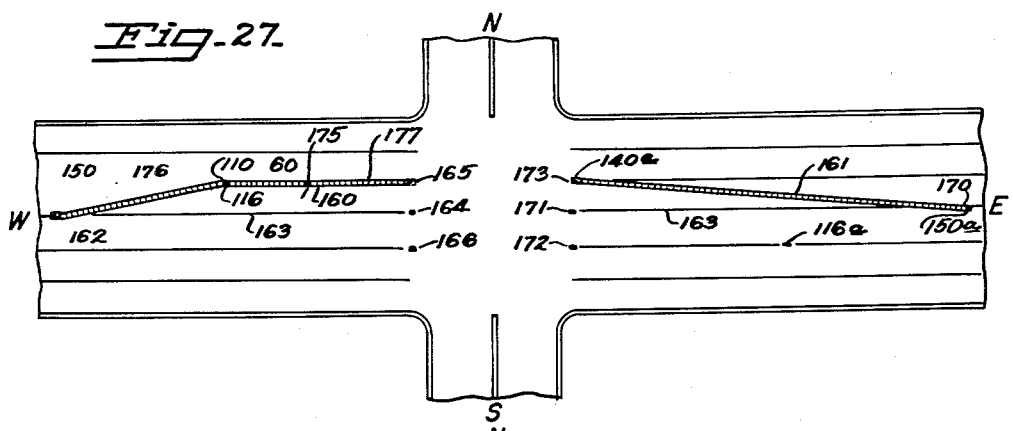
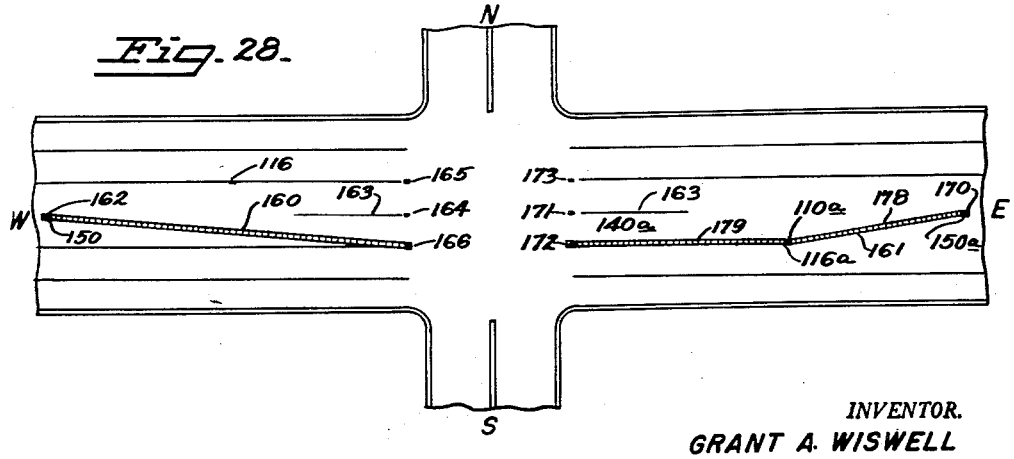

United States Patent Office 2,931,279
Patented Apr. 5, 1960

2,931,279

TRAFFIC CENTER LINE METHOD AND APPARATUS

Grant A. Wiswell, Burlingame, Calif.

Application March 11, 1954, Serial No. 415,625

8 Claims. (Cl. 94—1.5)

This invention relates to improved apparatus for and an improved method of traffic control. The invention particularly relates to an improved apparatus and an improved method for traffic channelization and separation, the management of traffic streams and the division of a roadway between two oppositely moving streams of traffic. The invention provides improved means for adjusting the separation of the several lanes of a roadway to care for major variations in the flow of traffic, so that the full width of a roadway may be efficiently utilized at all times. More particularly, the invention relates to a movable traffic "center-line" for separating the two directions of traffic, and for a method for moving the "center-line" to adjust the roadway to the changes in traffic load. The invention also relates to improvements in channelizing for intersections, detours, and other problem locations. The invention further relates to a novel article of manufacture, a unit which can be linked to other identical or similar units in end-to-end relationship to constitute the movable "center-line."

My invention solves many problems in the field of traffic control, problems which have existed for a long time and have been continually growing worse. Some examples will illustrate the importance of these problems. In metropolitan areas especially, the flow of traffic is subject to periodically fluctuating loads; sometimes most of the traffic flows in one direction; at other times most of it flows in the opposite direction.

Consider, for example, a main highway leading from the suburbs to the downtown business district. Between about 7 a.m. and 9:30 a.m. many more cars are driven toward the downtown area than are driven toward the suburbs. Between about 4 p.m. and 6:30 p.m. most of the cars head toward the suburbs, and few cars head downtown. At other times the traffic loads in the two directions may be substantially equal. Now a six-lane highway divided down the middle so that three lanes go in each direction, may very well carry the normal off-peak traffic load. However, in the early morning, the three lanes going downtown will be excessively crowded while the three lanes going toward the suburbs will be nearly empty. In the evening the situation will be reversed.

The broad solution to this problem is obvious and has long been known to traffic engineers: move the traffic center line to accommodate peak-hour traffic. In the early morning divide the six-lane highway into four lanes going downtown and two lanes going away from town. In the evening, use four lanes away from town and only two lanes downtown. At other times, use three lanes in each direction.

But although the broad solution may be obvious, it has been very difficult to put it into practice. On most highways, the center lines have either been painted on the surface of the roadway or have comprised permanent barriers, in both cases resulting in permanently divided lanes. So new ways of providing shiftable center-lines have been sought, but none of the systems heretofore tried have proved satisfactory.

One system was to place a large number of rubber cones, flags or other individually-movable means where the center-line is desired, moving each cone or flag several times during the day. These have had to be moved one at a time. Normally they have been placed on the street only during peak hours and have been removed for off-peak traffic, reliance then being made on painted lines. This system had many defects: it was expensive because of the labor cost of putting down the cones and flags and picking them up or moving them over. In one large Western city, more than one thousand men, using numerous trucks, have been required to service this system, because each changeover must be made within about one hour. The system was dangerous, because when the cones have been struck by cars, they have been knocked over or out of place, and have sometimes caused mishaps. Furthermore, a wind of over 25 m.p.h. will blow conventional cones out of line. The very nature of the cones and flags caused alarm to timid drivers who often reacted by veering into the adjacent lanes in attempts to avoid them, and when some of them were knocked over, a traffic snarl always resulted.

Another attempt at solving the shifting center-line problem has been used on the lakeshore highway in Chicago and is shown in the patents issued to Jellinek, Nos. 2,182,697 of December 5, 1939, and 2,287,685 of June 23, 1942, and to Pardee, 2,260,051 of October 21, 1941. In this system, the center-lines were composed of a plurality of parallel curb-like barriers which can be lowered flush with the street or can be raised substantially above the street. One or more barriers may be raised at the same time. One of the chief disadvantages of this system has been its installation cost, which ran substantially over $100,000 per mile when the system was first installed more than ten years ago, and would be much more expensive now. Moreover, the maintenance cost is exorbitantly high, because of the relatively large crew of men required for repairs and maintenance. In addition, the high vertical curbs of the barriers have proved dangerous, and serious wrecks have been caused when cars struck these curbs.

It will be noted that neither of these preceding systems moved a unitary centerline relatively to the road: one system individually moved each of many different markers; the other system raised and lowered each of several barriers, all set in a fixed position on the road.

My invention has solved this center-line problem by providing a novel unitary center-line apparatus which is movable across the road. My "center-line" is composed of a chain of short units linked together in a novel manner and transferable either by being slid across the roadway or by driving a special transfer vehicle along the line, continuously lifting the line of units, moving them over one or more lanes and depositing them in their new location—all without unlinking the units from each other. When the transfer is done by a self-propelled vehicle, the changeover can be made at between five to ten miles per hour by one operator. The installation cost of my system is low—below $20,000 per mile, or less than one fifth of that of the Chicago system, and the maintenance cost is much lower than in any of the systems heretofore known.

My invention has many other advantages besides being far more rapid in operation and less expensive than prior art systems. Perhaps its main advantage lies in its safety. A novel structure of the individual units makes it extraordinarily visible, so that the line of traffic separation is clearly defined. Moreover, the appearance is clearly that of a barrier; thus, drivers avoid driving over it. However, if the barrier is struck or ridden upon by a car tire, neither the car nor the tire will be harmed in the least, but a roaring vibration will be produced by the movement of the tire over the novel ribbed structure of my device. The roar warns the driver to move off the barrier, and the noise makes him want to get off. Moreover, the barrier can be safely crossed and re-crossed from any angle, and can even be skidded into safely. The result is that there are many fewer crossovers than with painted lines, and there are far fewer accidents than with painted lines or raised curbs or cones or flags.

My invention solves many other problems. It can be used in guiding and directing vehicular traffic at street intersections, on detours, on narrowed roadways where road repairs are being made, and in places where fixed channelizing patterns will not serve because the conditions vary, though usually they are repetitive.

For example, on many street intersections left-turn shelter lanes are critically needed during certain times of the day. At all other times, the presence of shelter lanes would be obstructive, and unnecessary. Permanent channelization cannot be satisfactorily employed, but my invention can be used to create any desired pattern while it is needed and to fluctuate between two or more pattern at different times of the day.

My invention can also be used in fixed channelizing patterns. There it offers the advantage of a continuously linked barrier that helps retain itself in place, is easily installed and fixed to the roadway, constitutes a better and safer barrier than has heretofore been available, and is easily removed, should removal be necessary, and installed elsewhere.

Many other objects and advantages of the invention will appear from the following description given in accordance with 35 U.S.C. 112.

In the drawings:

Fig. 1 is a diagrammatic plan view of a six lane highway showing how my invention is used to make the morning traffic changeover from three lanes going in each direction to four lanes going downtown and two lanes going away from town.

Fig. 2 is a view similar to Fig. 1 showing the mid-day traffic changeover to three traffic lanes in each direction.

Fig. 3 is a view similar to Figs. 1 and 2 showing the evening traffic changeover to four lanes going away from town and only two going downtown.

Fig. 4 is a view similar to Figs. 1, 2, and 3 showing the night traffic changeover to three lanes in each direction.

Fig. 5 is a diagrammatic plan view illustrating an eight-lane highway and showing how my device may be used to change the traffic pattern from four lanes in each direction to six lanes in one direction and two lanes in the other direction.

Fig. 6 is a top plan view of a portion of a traffic center line of my invention showing how it is composed of a string of interconnected units.

Fig. 7 is a view in perspective of a portion of my traffic center line, illustrating how it appears to a motorist.

Fig. 8 is a top plan view of a preferred form of an individual unit, enlarged with respect to the previous views.

Fig. 9 is a view in side elevation of the unit of Fig. 8.

Fig. 10 is a bottom plan view of the unit of Fig. 8.

Fig. 11 is an end view of the female end, looking from the left at Fig. 8.

Fig. 12 is a view in end elevation looking from the right at Fig. 8, showing the male end of the unit.

Fig. 13 is a view in section taken widthwise along the line 13—13 of Fig. 8.

Fig. 14 is a view in section of the male coupler taken along the line 14—14 of Fig. 8 and showing the shape of its socket.

Fig. 15 is a top plan view of a modified form of unit for use in installation where some units are to be positively, though removably, attached to positioning blocks in the street to prevent their displacement.

Fig. 16 is a view in side elevation of the unit of Fig. 15.

Fig. 17 is a view in section taken along the line 17—17 of Fig. 15, shown installed on a street.

Fig. 18 is a top plan view of an end unit with a female coupler at one end.

Fig. 19 is a view in side elevation of the female end unit of Fig. 18.

Fig. 20 is a view in section taken along the line 20—20 of Fig. 18, shown secured in place on a street by a stud.

Fig. 21 is a top plan view of a male end unit adapted to be secured at the opposite end from the female unit of Fig. 18 in a traffic center line.

Fig. 22 is a top plan view of a modified form of male end unit adapted to be grouted permanently into place. This unit is adapted as a stationary member at one end of a channelizing installation and for similar uses where the one end remains stationary, as distinct from the form in which the end unit is moved from one position anchor to another as in Figs. 18 through 21.

Fig. 23 is a top plan view of a modified form of female end unit, similar to the unit of Fig. 22, but located at the opposite end.

Fig. 24 is a reduced diagrammatic plan view of a traffic center line, with portions broken to conserve space.

Fig. 25 is a plan view showing the range of angles of two connected units.

Fig. 26 is a diagram of a traffic intersection employing my invention for channelizing, showing the normal off-hour channel locations.

Fig. 27 is a view similar to Fig. 26 showing the channelization at the peak hour for south-bound traffic.

Fig. 28 is a view similar to Figs. 26 and 27 showing channelizing at the peak hour for north bound traffic.

*A movable center-line for a six-lane highway (Figs. 1–4)*

Figs. 1 to 4 show diagrammatically how my invention solves the problem of adapting a highway to morning and afternoon rush hours. A highway 40 with six lanes 41, 42, 43, 44, 45, and 46 is shown. During off-peak times the highway 40 is divided to provide three lanes of traffic in each direction, as shown at the left hand side of Fig. 1, where my movable center line 50 is located along the center 51 of the highway 50. Just before the morning rush hour, the center line 50 (which will later be described in detail) is moved over (as shown in Fig. 1) on the line 52 that divides lanes 42 and 43. Then the downtown traffic can use four lanes (43, 44, 45 and 46) while the uptown traffic uses only two lanes (41 and 42), which are sufficient.

Preferably, the changeover is made in all these examples by employing a changeover vehicle 53 which will be dealt with in a separate application. For present purposes, it may be simply be described as a truck with an S-shaped conveyor channel 54 adapted to pick up the individual units of the center line 50 at the forward end without disconnecting them, move them over rollers or the like to the other side of the vehicle and then deposit them from the rear end at a distance from the original position exactly equal to the distance between the lines dividing the traffic lanes. As the vehicle 53 moves along away from town (as shown in Fig. 1), my movable center line 50 is changed from the center 51 of the highway 50 to a position overlying the line 52. This changeover can be accomplished at between five and ten miles an hour.

When the morning rush is over, an evenly divided roadway will carry the traffic loads better. Fig. 2 illustrates how the mid-day changeover is made. The vehicle 53 moves downtown, continuously transferring the center line 50 from its left-hand side to its right-hand side, as before, and depositing it back on the center 51 of the roadway 40 so that there are again three lanes on each side.

For the evening rush, the vehicle 53 again moves downtown, as shown in Fig. 3, to move the center line 50 from the center 51 to a position over the line 55 that divides lanes 44 and 45 so that four lanes carry the traffic leaving town and only two lanes 45, 46 lead toward town.

After the evening rush is over, the vehicle 53 is driven away from town to move the movable center line 50 back over the center 51 of the highway 40, so that once again three lanes lead in each direction.

*A movable center-line for an eight-lane highway (Fig. 5)*

One more example of the movable center line problem will be given before describing the line 50 itself. Fig. 5 shows that the changeover may be made two lanes at a time instead of one lane at a time, as in Figs. 1-4. Here an eight lane highway 56 is being changed from four lanes in each direction to six lanes in one direction and two lanes in the other direction. The vehicle 57 is like the vehicle 53 except for the fact that the conveyor 58 extends over the necessarily greater width. Obviously, the same principle can be used to move the traffic center line 50 any desired distance.

*The center-line in general (Figs. 6 and 7)*

A general impression of what my novel center line 50 looks like can be gained from Figs. 6 and 7. It will be seen that the center line 50 is a clearly defined and formidable-appearing barrier, preferably painted in accordance with local practice (e.g., black down the center and orange or white at the sides) and that it comprises a large number of identical or similar units 60, coupled together by a male coupler 61 at one end of each unit 60 and a female coupler 62 at the opposite end. The coupling permits the units 60 to swing relatively to each other approximately 25° in each direction along a horizontal plane and also to swing vertically a smal amount. This swing is made sufficient to accommodate anq traffic installation in which the units 60 can be used, and can be made greater or less, if desired.

The general appearance of the line 50 to the driver (Fig. 7) is of a ribbed or latticed barrier marking a line he is not to cross.

*A preferred basic unit (Figs. 8-14)*

A preferable structure of the individual units 60 is shown in Figs. 8 through 14. Each unit 60 is generally rectangular with its male coupler 61 extending out from one end and its female coupler 62 at the opposite end. The sides of the unit comprise a parallel pair of side rails or base members 63, 64. They extend longitudinally, spaced well apart from each other and their lower surfaces 65 are adapted to rest on the roadway. Each rail 63, 64 is generally rectangular in cross section (Fig. 13) and flat on its top surface 66. The corners and edges are preferably rounded to avoid injury to workers and damage to car tires. Its vertical thickness is much smaller than its width. In a typical installation it may be about ⅜" thick and 1⅝" wide. This permits water to drain over it, so that the remaining portions of the units 60 will always be above water, if the drainage of the road is any good. Preferably, the upper surface 66 is generally rough, to give good traction for tires that may engage it.

The structure of the rails 63, 64 accomplished several purposes. For one thing, the weight of the units is supported entirely by the bases or rails 63 and 64, assuring maximum pressure of the unit 60 on the road. Second, stability is assured even where the crown of the road is curved, so that the unit 60 will never teeter. Third, help is obtained in keeping the units 60 free from debris, while they are on the road and in getting rid of any debris that may have been collected, while the center-line 50 is being transferred.

In between the rails 63, 64, generally parallel to them but on a higher level and spaced from them, are a pair of parallel bars 70, 71, which are generally rectangular in shape and stand on edge. Actually their lower face 72 may be somewhat wider than their upper face 73 so that, more accurately speaking, they are, preferably, generally trapezoidal in cross section, but the trapezoid is not far from being a rectangle. The vertical thickness is preferably much greater than the width, a typical unit 60 had bars 70, 71 that were about 1⅛" high by about ⅜" wide. The edges and corners may be rounded, to afford protection to automobile tires. The lower surface 72 of each bar is preferably about on a level with the upper surface 66 of each rail, so that the upper surface 73 of the bars is about 1½" to 1⅝" above the roadway.

Cross ribs 75 extend transversely between the rails 63, 64 and bars 70, 71. Since the unit 60 is preferably a unitary casting, the rigs 75, bars 70, 71 and rails 63, 64 may all be integral with the male and female ends 61, 62. The lower surface 76 of each rib 75 rises from the lower surface 65 of the rails 63, 64 at the inner edge 67 thereof, and slopes up to the lower surface 72 of the bars, preferably in a curve (see Fig. 13). The upper surface 77 of each rib 75 rises from the upper surface 66 of the rails 63, 64, near the outer edges 68, and curves convexly up to the bars 70, 71, slightly below their upper surface 73. In between the bars 70, 71 the lower surface 76 of the ribs 75 is substantially co-planar with the lower surfaces 72 of the bars, while the upper surface 77 is preferably a little lower than the upper surface 73 of the bars 70, 71.

The ribs 75 serve several purposes. For one thing, when the ribs 75 are painted, their vertical disposition presents to the motorist a substantial eye-catching area clearly defining the center line 50 of traffic. In the next place, the ribs 75 present what appears to be a series of sharp edges that would harm the tires, whereas actually they are blunt and rounded, though stood on edge, and will not in the least damage the tires. Therefore, the motorists try to keep off them for reasons in addition to whatever respect they may have for the sanctity of the center-line as such, but if they should accidentally get on the units 60, no harm is done. Moreover, when the unit 60 is driven over, the movement of the tires over the empty spaces and the raised construction of the ribs 75 produces a very loud vibrating noise, a roar that serves to warn the motorist that he is driving on the center-line 50 where he should not be, and this roar has the psychological effect of making him want to get off the center-line 50 as soon as he can. In addition, the ribs, 75, of course, greatly strengthen the unit 60, as do the bars 70, 71, which also add to the noise effect and to the visibility of the unit 60, because they make the unit 60 stand out clearly when seen from the side (compare Fig. 7).

The open, lattice-like construction of the unit 60 not only adds to its visibility and formidable appearance; it also means that any debris which tends to be caught will drop freely out when the unit 60 is lifted on the transfer vehicle and will not be carried with it. Also, drainage of the unit 60 is adequately assured.

The female coupler 62 of the unit 60 comprises an arcuate jaw 80 set in between a pair of shoulders 81, 82. The inner edges 83 of the shoulders 81, 82 may be substantially perpendicular to the side rails 63, 64 and may be shaped generally like the ribs 75, through the shoulders 81, 82 terminate in the jaw 80 and so do not extend all the way across the unit 60. The outer edges 84 of the shoulders 81, 82 are inclined outwardly, as viewed in plan, at an angle of about 25° with respect to the inner edge 83 or the width-wise line perpendicular to the rails 63, 64, and they terminate in short non-inclined portions 84a, adjacent to the outer ends, 85, 86 of the jaw 80. The shoulders 81, 82 are thickened to give bulk and strength to the outer part of the jaw 80.

The jaw 80 is a circular sector, preferably greater than a semi-circle and ideally about 260°, symmetric with the longitudinal axis of the unit 60 and open at its outer end between the jaw ends 85, 86. Its lower surface 87 and the lower surface 88 of the shoulders are raised above the lower surface 65 of the rails 63, 64, preferably about to the level of the lower surface 72 of the bars 70, 71, which terminate against the jaw 80. A diametric rod 89 extends widthwise across the jaw 80, for a purpose which will soon be made apparent.

The male coupler 61 of the unit 60 comprises a head 90 joined to the thickened rectilineal end rim 91 by a neck 92, which is preferably strengthened by a rib 93 running along its upper surface on the longitudinal axis of the unit 60. The head 90 is circular, as seen in plan, and has a slot 94 on its upper surface 95, leading down into a locking socket 96 in between the upper surface 95 and the head's lower surface 97 (see Fig. 9).

The slot 94 is diametric and is wide enough to receive the cross rod 89 of the female coupler 62. It is inclined to the longitudinal axis of the unit 60 at an angle of about 65°, which corresponds to a 25° inclination to the widthwise direction. It is therefore approximately parallel to the shoulder 81 at the female end 62. The length of the neck 92 is so proportioned that an extension of the line of the slot 94 would be about tangent to one corner 98 of the unit. When joining two units 60 together, the female end 62 is placed over the male end 61, with the longitudinal axes of the units inclined at an angle of about 25°, so that the pin or rod 89 can enter the slot 94 and go down into the socket 96, and the jaw 80 then encircles the round head 90.

The socket 96 represents a pair of facing circular sectors 100, 101 (see Fig. 14), located symmetrically with respect to the longitudinal and widthwise axes of the head 90. The sides of the socket 96 thereby permit the pin 89 of the adjacent unit to rotate about 50°, from the position where the shoulder 82 engages the rim 91 (as during installation of the pin 89) to the position where the shoulder 81 engages the rim 91 (see Fig. 25).

On the bottom surface 102 of the head 90 and neck 92 I prefer to provide a depending star-like member or fin 103 (Fig. 10) substantially co-planar with the lower surface 66 of the rails 63, 64 (Fig. 9) and adapted to lie flush on the pavement, to absorb any shock and prevent any blows from affecting the linkage or breaking off the neck 92.

A feature of the invention is that no reliance for retaining the linkage is made on an engagement of the cross rod 89 with the sides of the socket 96. The main stresses are resolved by the direct engagement of the inner periphery 104 of the jaw 80 with the outer circular periphery 105 of the head 90. The jaw ends 85, 86 engage the periphery 105 under pulling stresses, while a pushing force engages the head 90 against the center portion of the jaw periphery 104, and no force is ever exerted by the center rod 89 against the sides of the socket 96.

Sometimes it is desired to fix some units 60 in place temporarily or permanently. To aid in carrying out this purpose, a pocket 106 may be provided, preferably adjacent the jaw 80. The pocket 106 is bounded by the jaw 80, the bars 70, 71, and a cross rib 75. It extends down vertically in this generally rectangular area to a floor 107, which is provided with a central perforation 108. A fastening stud (not shown in Figs. 8–14 but shown at 122 in Fig. 20) may be shot therethrough into the pavement by a gun (not shown) or may be secured in place by some other method. When the center line 50 is to be used in permanent installations or semi-permanent ones, the pin 122 will hold in place each unit 60 which is so provided (see Fig. 20). Alternately, in some installations, signal flags (not here shown) can be installed in the pockets 106 of some of the units 60, to give speed limit or other warning signals.

The center line 50 (Figs. 1–7) is made by joining together a series of units 60, or similar units. In each instance, coupling and uncoupling can be done only when the two consecutive units 60 are at the maximum angle to each other and then only when there is relative vertical movement between the two units; so the units 60 will not come apart accidentally, either while on the street or during transfer. Figs. 6 and 25 illustrate how the units 60 fit together consecutively and how they can be rotated relatively to each other, to accommodate for curves in the road, as well as for movement into and out of the transfer vehicle.

*Modified forms of anchored units for particular applications (Figs. 15–23)*

Figs. 15–17 show a modified form of unit 110 which may be used at various intermediate points to lock the line 50 temporarily to the street, or may be used at the pivot point, where an angle is desired as distinct from a curve (see Figs. 26–28). Many portions of unit 110 are substantially identical to those of the unit 60, and these parts are identified in the drawing by the same reference numbers (e.g., the male coupler 61, female coupler 62, bars 70, 71, and pocket 106). It will be noted that none of the cross ribs 111, 112 pass across between the bars 70, 71, but only connect the bars 70, 71 to the side rails 113, 114, which in this instance are preferably stepped, to provide the additional strengthening required due to the absence of the cross ribs 75 in between the bars 70, 71. The open space 115 between the bars 70, 71 serves to receive and interlock with a block 116, which may be permanently set in the roadway. The unit 110 may be freely lifted from the block 116, for transfer or removal. It will be noted from Fig. 17 that the block 116 need not be so high as the bars 70, 71, where the bars 70, 71 are about 1⅝" above the under surface 117 of the rails 113, 114.

Figs. 18–21 illustrate end units 120 and 130 by which each end of the center line 50 may be secured to the roadway. Figs. 18–20 show a short unit 120, which has a female coupling member 62 at one end like that of the unit 60, and a rounded outer end 121 where the center line 50 terminates. The end unit 120 is provided with a pocket 106, and Fig. 20 shows how a stud 122 may be set through the opening 108 through the pocket floor 107 and extend down into the street 123. The side rails 124 and 125 are short versions of the rails 113, and 114, and the bars 126, 127 are short versions of the rails 70, 71. The end portions 62 and 121 include what cross-ribbing is present.

Fig. 21 shows a similar unit 130 with a male coupler 61 and a rounded outer end member 131. This unit 130 would be located at the opposite end of the line 50 from the unit 120. It has a pocket 106, side rails 132, 133, bars 134, 135, and a cross rib 136.

A complete center line 50 is made by joining together a series of units 60, 110, 120, and 130. In each instance, coupling can be made only when the two consecutive units are at the maximum angle to each other; so the units will not come apart accidentally, either while on the street or during transfer. At one end of the line 50 is a female unit 120, and at the other end is a male unit 130. In between are mainly units 60, though there may be one or more units 110 where the situation demands. Fig. 24 illustrates such a line.

Fig. 22 shows a modified form of male end unit 140, which is a cross between units 110 and 130. At one end is the male coupler; at the other end is the rounded end 131. In between are side rails 141, 142 joined by cross ribs 134, 135 to bars 136, 137. Between the bars 136, 137 is an opening 138 resembling the opening 115 of the unit 110 and for the same purpose. This structure makes it possible to releasably secure the end unit 140 to a block in the street like the block 116 of Fig. 17.

The unit 150 of Fig. 23 is a female end unit and is a cross between the units 110 and 120. It has a female coupler 62 at one end and a rounded end 121 at the other end. In between are side rails 151, 152 joined by cross ribs 153, 154 to longitudinal bars 155, 156, between which is the opening 157, which is adapted to fit over a block like the block 116 of Fig. 17. Both the units 140 and 150 may also be provided with pockets 106 when a stud 122 may be provided if desired, as in Fig. 20.

Use of the invention in tersection channelizing
*(Figs. 26–28)*

Short lengths of my system may also be used at intersection channelizing, as shown in Figs. 26, 27 and 28, which illustrate one way in which the invention may be used.

Here, a main thoroughfare, running east and west crosses another street running north and south, all as indicated by the letters E, W, N, and S on the drawings.

During normal traffic conditions there is no need for sheltering left-hand turns, but during either the morning or evening rush hours, the provision of a left-hand turn shelter in the direction of the predominate traffic flow helps both to protect those desiring to turn left and to enable a more rapid flow of through traffic. In the morning, the predominate traffic flow is assumed here to be from west to east, so that shelter is needed on the south side of the street (Fig. 27), while in the evening shelter is needed for left turns from the north side (Fig. 28).

The channelizing here is done by using two relatively short strings or barriers 160 and 161 of centerline made up from bars 60, 110, 140, and 150. In addition, a certain number of anchor blocks are permanently located in the street.

On the west side of the intersection, a round pivot block 162 is located at the west end of the string 160 in the center of the street, along the center division 163 between lanes. A unit 150 forming the western terminus of the string 160 fits over this block 162, so that it can turn in either direction, as shown in the drawings.

At the intersection, where the line 160 terminates, there are three rectangular anchor blocks 164, 165, and 166, located one lane apart, with the block 164 on the center line 163 and the block 165 one lane north of center, and the block 166 one lane south of center. A unit 140, forming the eastern terminus of the string 160, fits over any one of the three blocks 164, 165, and 166, depending on the pattern desired.

In between the units 140 and 150 and one lane north of center is a rectangular block 116, adapted to anchor a unit 110 for the pattern shown in Fig. 27. On the eastern side of the intersection there are similar blocks 170 at the eastern end, in the center, 171, 172, and 173 at the western end and 116a in the middle, for blocks 150a, 140a and 110a respectively. Otherwise, both barriers 160 and 161 may be made from units 60.

For normal traffic the barriers 160 and 161 extend straight down the center 163 of the street. The unit 140 is anchored on the block 164; the unit 140a is anchored on the block 171; and the units 110 and 110a are unanchored. The unit 150 is always anchored, pivotally, on the round block 162, and the unit 150a is always anchored pivotally on the round block 170.

When west-to-east is the direction of the overwhelming flow of traffic, the pattern shown in Fig. 27 may be used to provide a left-hand-turn shelter lane 175 on the south side of the thoroughfare. To accomplish this, the east end unit 140 is moved from the center anchor block 164 to the north anchor block 165, and the unit 110 is moved north and anchored to the block 116. This means that an angular barrier portion 176 is provided between the end unit 150 and the unit 110, and that a straight barrier portion 177 is provided one lane north of center, so that cars desiring to turn left (north) from the south side of the road can get into the lane 175, out of the way of the through traffic and separated from the east-to-west traffic by the barrier 160. To insure complete protection, the barrier 161 is made into a diagonal, pushing east-to-west traffic into two lanes before the intersection is reached. This is done by anchoring the unit 140a on the block 173.

In the evening, when east-to-west traffic predominates, the pattern shown in Fig. 28 is used to provide a shelter for those turning left (south) from the north side of the thoroughfare. The barrier 160 is arranged diagonally, with the east end unit 140 anchored on the block 166. The barrier 161 has a diagonal portion 178 between its east-end unit 150a and the unit 110a, which is anchored by the block 116a, and a straight portion 179 between the unit 110a and the west-end unit 140a, which is then anchored on the block 172.

The simplicity of the change and the adaptability achieved thereby illustrate how this invention may be used in many channelizing patterns, bringing not only adaptability and speed but greater safety.

The use of this invention in fixed channelizing

Although one of the main features of this invention is its ability to provide a movable center line and movable channelizing pattern, the units also can be used as fixed centerlines or as fixed channelizing patterns. No particular drawing shows the patterns, because none is needed; any pattern shown could be a permanent one, or the center-line of the street could provide the pattern. Fig. 20 shows how any unit 60, 110, 120, 130, 140, or 150 can be permanently anchored by firing a stud 122 into the street through the opening 108 in the floor 107 of the pocket 106. For permanent installations, the end units 120 and 130 are preferable, with the units 60 used in between.

Note that the units are not sunk in the street or mostly buried. The barrier remains resting on the street, anchored by the stud 122. All the visibility, safety, and warning features of the barrier remain applicable. Furthermore, removal is easier than with buried units. The raised barrier, resting on the roadway, is an important feature of this invention.

Summary of advantages of the invention

A few of the advantages of the invention will be pointed out briefly. The ribs or fins 75, the bars 70, 71, and the rails 63, 64, stand out very clearly, especially when painted, and give the centerline 50 greater visibility than either a painted line or the usual round barrier. Even during a driving rain, which would completely obscure a painted line, the barrier 50 stands out clearly.

The device is safe. Its low crown can be crossed without danger and without damage to tires. The roaring noise emitted when tires drive over it causes the drivers to get off it quickly and prevents their crossing it accidentally. Providing the metal with a roughened surface is preferable, to insure good traction.

The device is self-cleaning because of its open structure, and when it passes through a transfer vehicle, the debris and dirt that have been collected are left behind or shaken out. It is self-draining, water draining out the ends and, if high, over the bars 63, 64.

The flat top makes it easy to paint it uniformly with a paint machine.

The units are strong and durable. The star 103 on the bottom of the male member 90 strengthens it and transmits any pressure directly to the road. The neck 92 is as strong as the remainder of the device. The pressure of any pull is against the jaw ends and not on the neck.

The units, having their lower surface raised above the side bars 63, 64, remain stable on the road, bridging the crown. They will not teeter and the maximum pressure is exerted on the road.

The units are easily joined together or taken apart. They hold together during transfer, even when lifted, and their turning radius accommodates the curves in the road and the curves in a transfer vehicle.

The pocket 106 makes it possible to secure any unit permanently in place on a road or to place lights, targets, markers, etc., therein.

To those skilled in the art to which this invention relates, many changes in construction and widely differing embodiments and applications of the invention will sug-

I claim:

1. A traffic center line and the like, including in combination: a plurality of interconnected units, each unit having a parallel pair of longitudinal side rails, spaced well apart from each other and adapted to rest on the road surface, the vertical thickness of each said rail being smaller than its width and a parallel pair of longitudinal bars spaced from each other and in between and spaced from said side rails, the lower surface of said bars being spaced above the plane of the lower surface of said rails; each unit except the two end units having a plurality of cross ribs extending transversely and rising from said rails to said bars, and much higher adjacent said bars than adjacent said rails, said cross ribs being on-edge so that their thickness, measured length-wise of the unit is much less than the maximum height thereof; each unit except one end unit having a male end comprising a thickened transverse end member joining together said rails and said bars and a projecting male coupler extending out from the central portion thereof and having a relatively narrow neck portion and a head that is circular as seen in plan, said head having a slot therein open at the upper surface and inclined to the end member so that if extended it would be about tangent to one corner thereof, said slot leading to an enlarged slot intermediate the upper and lower surfaces of said head, its sides defining an open area corresponding to the rotational portion of the slot and over an arc to a line generally inclined to said end member in the opposite direction from said slot in a position where an extension thereof would be approximately tangent to the opposite corner of said end member, the lower surface of said head having a rib extending down to about the plane of the lower surface of said rails; each unit except the other end member having a female end comprising a central jaw intermediate said rails and joined thereto by a pair of thickened end members each extending out at an angle to the widthwise line of the unit at that location, said jaw being arcuate and extending around for a distance substantially greater than a semicircle and having a widthwise rod extending diametrically thereacross, said jaw being adapted to receive said head with said rod fitting in said slot, the jaws adjacent their open ends being adapted to engage the outside of said head before said rod can touch the sides of its slot, each said end member having at its outer end a rounded end member, semicircular as seen in plan.

2. A traffic center line and the like, including in combination a plurality of units, each unit having a parallel pair of side rails adapted to rest on the road surface, a parallel pair of bars in between and spaced from said side rails with the lower surface of said bars being spaced above the plane of the lower surface of said rails, a plurality of cross ribs extending transversely across and joining together each said rail and its adjacent said bar and extending higher than the upper surface of said rails; all units except one end unit having a male end comprising a thickened end member joining together said rails and said bars and a projecting male coupler extending out lengthwise from the central portion thereof and terminating in a head, said head being circular as viewed in plan and having a diametric slot in its upper surface leading down to an enlarged socket intermediate the upper and lower surfaces of said head, its sides defining a sector; all units except the other end unit having a female end comprising a central arcuate open-end jaw intermediate said rails and joined thereto by a pair of thickened end members, said jaw being adapted to receive a said head of an adjacent unit and having a widthwise rod extending diametrically thereacross and adapted to fit in said slot and to rotate in said socket, the jaw adjacent its open ends being adapted to engage said head and prevent said rod from engaging the sides of the socket; said end units terminating at one end in a solid end member, said units being coupled together in a continuous string.

3. A generally rectangular unit adapted for connection with like units in series to form a traffic center line and the like, comprising: a parallel pair of longitudinally extending side rails, spaced well apart from each other and adapted to rest on the road surface, each said rail being stepped as viewed in cross-section and its vertical thickness being much smaller than its width; a parallel pair of longitudinally extending bars spaced from each other and in between and spaced from said rails, each said bar being generally rectangular in cross section and on edge, its vertical thickness being much greater than its width, the plane of the lower surfaces of said bars being spaced above the plane of the lower surfaces of said rails; coupling means at one end, including a thickened end rim joining said rails and bars; and a rounded thickened rim at the opposite end, joining together said rails and bars, and having its lower surface substantially coplanar with the lower surfaces of said rails, said end being approximately semicircular as viewed in plan and curved as viewed in vertical section, being low at its outer edges and high at its inner end where it joins said bars.

4. The end unit of claim 3 in which the coupling means comprises a male end having a transverse rim joining together one end of said rails and bars and a projecting male coupler extending out lengthwise from the center of said rim and having a neck portion and an enlarged head at the outer end of the neck, said head being circular as viewed in plan and having a generally rectangular diametric slot in its upper surface inclined at about 65° to the longitudinal axis of the unit, said neck and head being so proportioned that an extension of the line of said slot would be about tangent to one corner of said rim, said slot leading down to an enlarged socket intermediate the upper and lower surfaces of said head, the sides of said socket defining an area of a pair of diametrically opposite sectors extending about 50° from said slot, through said longitudinal axis to a line generally inclined about 65° to said axis in the opposite direction, so that an extension thereof would be approximately tangent to the opposite corner of said rim, the lower surface of said rim, neck and head lying generally along the plane of the lower surface of said bars but having a fin extending down to about the plane of the lower surface of said rails.

5. The end unit of claim 3 in which said coupler comprises a female coupler having a jaw symmetric along the longitudinal axis of the unit and intermediate said rails and joined thereto by a pair of thickened shoulders each extending out from the ends of said rails at an angle of about 25° to the widthwise line perpendicular to said rails, said jaw being a circular sector of approximately 260° open at the outer end and joined directly to said bars at one end thereof, and having a rod extending diametrically thereacross on a line perpendicular to said rails, the lower surface of said jaw being higher than the lower surface of said rails.

6. In an articulated and movable lane divider for a highway for effecting traffic control including a plurality of similar units extending along and resting on the highway and connected end-to-end for limited angular movement laterally thereof and releasably locked together, each unit comprising a ground engaging base having a raised top portion thereon, an elongated member projecting from one side portion of the unit, said unit having a recess adjacent another side portion thereof, the free end portion of said elongated member having an opening therein and also being of a size and shape to fit within the recess of a unit for angular movement limited by the walls of the recess and means secured to the wall of said recess and extending into the recess swivelly interlockingly engaging within the opening in the free end portion of the elongated member of an adjacent unit.

7. In a multi-lane highway having a lane dividing strip freely resting thereon and extending therealong in the form of a plurality of rigid members interconnected in end-to-end relation against separation and for limited angular movement in both horizontal and vertical planes while resting on said highway, the method of reapportioning the number of lanes of traffic on each side of said strip comprising, propelling a vehicle along said highway on one side of said strip which is in the direction of traffic flow, raising successive interconnected members of said strip onto the vehicle while it is thus moving along the highway, guiding the interconnected raised members crosswise of the vehicle to a new position across the width of the one lane in which the vehicle is moving and depositing said interconnected members on the highway in a new unbroken line to thereby increase or decrease the number of indicated traffic lanes in the direction of movement of the vehicle.

8. In an articulated and movable lane divider for a highway for effecting traffic control including a plurality of interconnected units extending along and resting on the highway and connected in end-to-end relation for limited angular movement laterally thereof and releasably locked together, each unit comprising a ground engaging base having a raised top portion, an elongated member projecting from the raised top portion and terminating at its free end in a disc-like member having a diameter which is greater than the width of the extension, the frame being recessed inwardly from an opposite edge portion thereof, the recess being of circular formation except for the opening leading into the recess and having a diameter substantially equal to that of the disc-like member, a rod extending across the recess, a surface of the disc-like member having a groove therein of a width substantially that of the rod and an undercut recess leading from the groove and extending through the periphery of the disc-like member and of a greater width than the groove, whereby the circular disc-like member of one unit may enter the recess of another unit for limited angular movement parallel to the highway and be locked against separation in a direction normal thereto when the rod of one unit is within the undercut recess of the other unit.

References Cited in the file of this patent

UNITED STATES PATENTS

| | | |
|---|---|---|
| D. 172,324 | Wiswell | May 25, 1954 |
| 1,683,121 | Baldwin | Sept. 4, 1928 |
| 2,143,433 | Curtis | Jan. 10, 1939 |
| 2,313,600 | Talty | Mar. 9, 1943 |
| 2,841,059 | Wiswell | July 1, 1958 |

FOREIGN PATENTS

| | | |
|---|---|---|
| 738,891 | France | Oct. 24, 1932 |
| 650,674 | Great Britain | Feb. 28, 1951 |